(12) United States Patent
Harada

(10) Patent No.: US 9,485,835 B2
(45) Date of Patent: Nov. 1, 2016

(54) CONTROL APPARATUS, CONTROL METHOD AND CONTROL SYSTEM

(71) Applicant: Panasonic Intellectual Property Management Co., Ltd., Osaka (JP)

(72) Inventor: Shun Harada, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/001,627

(22) Filed: Jan. 20, 2016

(65) Prior Publication Data

US 2016/0234910 A1    Aug. 11, 2016

(30) Foreign Application Priority Data

Feb. 6, 2015   (JP) .................. 2015-022053

(51) Int. Cl.
  *G02F 1/07*    (2006.01)
  *G09G 5/00*    (2006.01)
  (Continued)

(52) U.S. Cl.
  CPC ....... *H05B 37/0209* (2013.01); *B64D 11/0015* (2013.01); *B64D 47/02* (2013.01); *G02F 1/0121* (2013.01); *G02F 1/17* (2013.01); *G05B 15/02* (2013.01); *G06F 3/14* (2013.01); *G09G 3/006* (2013.01); *G09G 5/10* (2013.01); *G06F 3/1423* (2013.01); *G09G 2320/06* (2013.01)

(58) Field of Classification Search
  CPC .................. G09G 2320/06; G09G 2320/064; G09G 3/006; G09G 3/20; G09G 3/2014; G09G 3/3414; G09G 3/3648; G09G 5/04; G09G 5/10; G09G 5/14; H04N 1/00127; H04N 1/00129; H04N 17/02; H04N 17/04; G06F 3/14; G06F 3/1423

USPC .......... 359/259, 245; 345/2.1, 82, 156, 204, 345/207, 212, 690; 340/438, 439, 933, 988
  See application file for complete search history.

(56) References Cited

U.S. PATENT DOCUMENTS 5,786,801 A    7/1998  Ichise
6,853,387 B2 *  2/2005  Evanicky ............... G09G 3/006
                                                   345/204

(Continued)

FOREIGN PATENT DOCUMENTS

JP    02-151547      6/1990
JP    10-097202 A    4/1998

*Primary Examiner* — Loha Ben
(74) *Attorney, Agent, or Firm* — McDermott Will & Emery LLP

(57) ABSTRACT

A control apparatus of the present disclosure includes a communication unit configured to receive adjustment information relating to brightness adjustment from a plurality of controlled objects capable of brightness adjustment, and to transmit an adjustment instruction relating to brightness adjustment to the plurality of controlled objects, and a controller configured to specify a first group, which includes at least one of the plurality of controlled objects adjusted brightness in a predetermined period among the plurality of controlled objects based on the adjustment information received by the communication unit, and a second group, which includes at least one of the plurality of controlled objects not included in the first group, and to determine the adjustment instruction based on the adjustment information in the plurality of controlled objects included in the first group, and to instruct the plurality of controlled objects included in the second group to adjust brightness by the instruction.

18 Claims, 9 Drawing Sheets

(51) Int. Cl.

| | |
|---|---|
| *H05B 37/02* | (2006.01) |
| *G02F 1/01* | (2006.01) |
| *G02F 1/17* | (2006.01) |
| *B64D 47/02* | (2006.01) |
| *G05B 15/02* | (2006.01) |
| *B64D 11/00* | (2006.01) |
| *G06F 3/14* | (2006.01) |
| *G09G 3/00* | (2006.01) |
| *G09G 5/10* | (2006.01) |

(56) References Cited

U.S. PATENT DOCUMENTS

| | | | |
|---|---|---|---|
| 7,068,263 B2* | 6/2006 | Evanicky | G09G 3/006 345/207 |
| 7,245,276 B2* | 7/2007 | Yamada | G09G 3/325 345/211 |
| 7,405,742 B2* | 7/2008 | Evanicky | G09G 3/006 345/204 |
| 7,430,022 B2* | 9/2008 | Hekstra | G09G 3/3413 345/83 |
| 8,179,405 B2* | 5/2012 | Evanicky | G09G 3/006 345/207 |
| 8,471,841 B2* | 6/2013 | Evanicky | G09G 3/006 345/212 |
| 8,654,044 B2* | 2/2014 | Inoue | G09G 3/2014 313/463 |
| 8,687,233 B2* | 4/2014 | Hirano | H04N 1/6011 358/1.9 |
| 2013/0207947 A9* | 8/2013 | Davies | G09G 5/10 345/207 |

* cited by examiner

FIG. 5

| Onboard monitor | Previously luminance level | Current luminance level | Difference | Monitor group | Average | Threshold |
|---|---|---|---|---|---|---|
| 200A | 4 | 4 | 0 | Second | 2.25 | 2 |
| 200B | 5 | 2 | 3 | First | | |
| 200C | 4 | 1 | 3 | First | | |
| 200D | 3 | 2 | 1 | First | | |
| 200E | 3 | 3 | 0 | Second | | |
| 200F | 4 | 2 | 2 | First | | |

# CONTROL APPARATUS, CONTROL METHOD AND CONTROL SYSTEM

RELATED APPLICATIONS

This application claims the benefit of priority of Japanese Application No. 2015-022053, filed on Feb. 6, 2015, the disclosure of which is incorporated by reference herein.

BACKGROUND OF THE INVENTION

1. Field of the Invention

The present disclosure relates to a control apparatus, a control method and a control system available in an airplane, a train, and the like.

2. Description of the Related Art

PTL 1 discloses a backlight control apparatus that detects current brightness of a backlight of a display apparatus and that, based on a comparison result between current brightness and a predetermined luminance level, limits current brightness of the backlight to the predetermined luminance level. With this configuration, the backlight control apparatus can equalize brightness of a plurality of display apparatuses.

CITATION LIST

Patent Literature

PTL 1: Unexamined Japanese Patent Publication No. 10-97202

SUMMARY OF THE INVENTION

The present disclosure provides a control apparatus, a control method and a control system capable of brightness adjustment of controlled objects depending on the situation.

A control apparatus of the present disclosure includes a communication unit configured to receive adjustment information relating to brightness adjustment from a plurality of controlled objects capable of brightness adjustment, and to transmit an adjustment instruction relating to brightness adjustment to the plurality of controlled objects, and a controller configured to specify a first group, which includes at least one of the plurality of controlled objects adjusted brightness in a predetermined period among the plurality of controlled objects based on the adjustment information received by the communication unit, and, a second group which includes at least one of the plurality of controlled objects not included in the first group, and to determine the adjustment instruction based on the adjustment information in the plurality of controlled objects included in the first group, and to instruct the plurality of controlled objects included in the second group to adjust brightness via the communication unit by the adjustment instruction.

The control apparatus, the control method and the control system of the present disclosure can adjust brightness of the controlled objects depending on the situation.

BRIEF DESCRIPTION OF DRAWINGS

FIG. 5 is a diagram describing an example of the operation for adjusting luminance of the onboard monitor in the first exemplary embodiment.

DETAILED DESCRIPTION OF THE PREFERRED EMBODIMENTS

Exemplary embodiments are described in detail below with proper reference to the drawings. However, an unnecessarily detailed description may be omitted. For example, a detailed description of an already well known matter and a duplicate description for substantially the same configuration may be omitted. This is to avoid the unnecessarily redundant description below, and to facilitate understanding of those skilled in the art. Incidentally, accompanying drawings and the description below are provided so that those skilled in the art sufficiently understand the present disclosure, and are not intended to limit the claimed subject matter.

First Exemplary Embodiment

A first exemplary embodiment is described below with reference to FIG. 1 to FIG. 5.

[1-1 Configuration]

Figure 1:
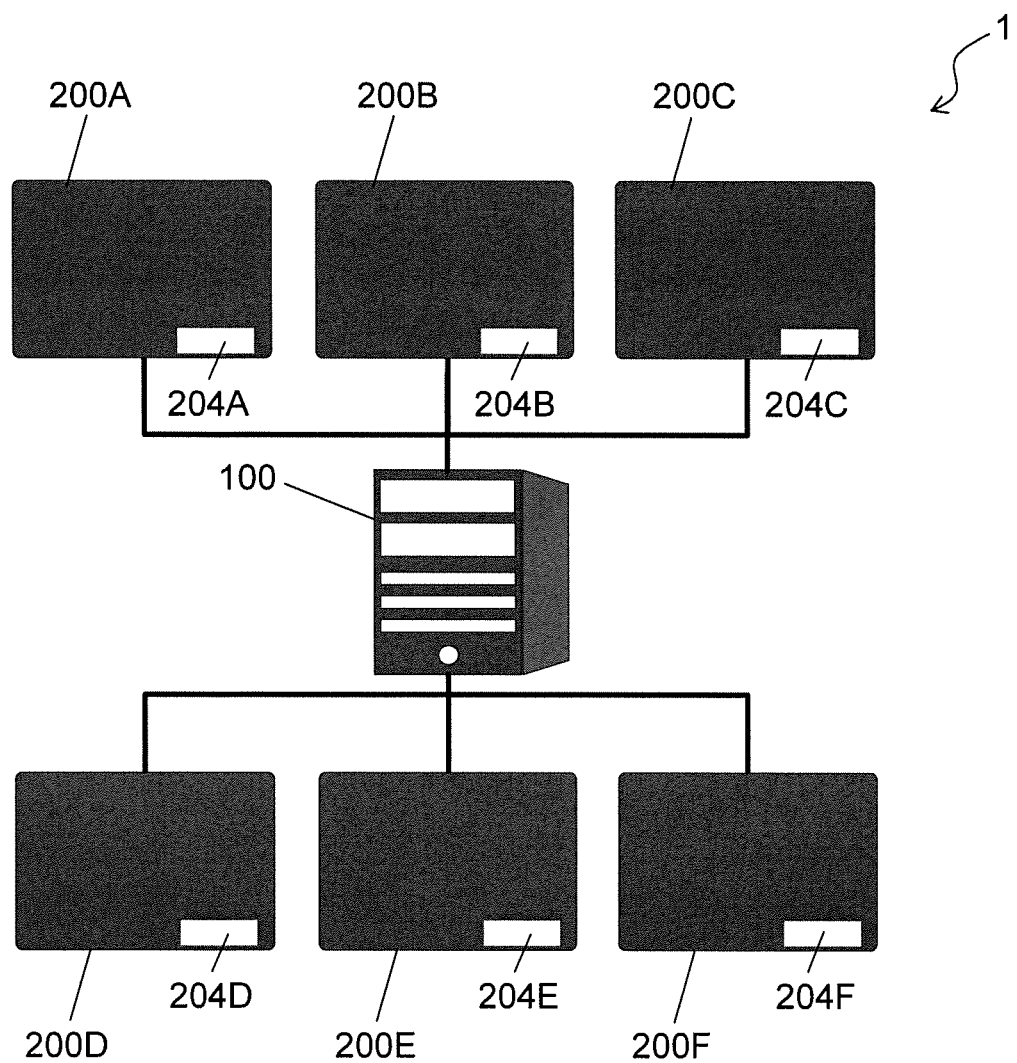
FIG. 1 is a block diagram of an onboard system in a first exemplary embodiment.

FIG. 1 is a block diagram of onboard system 1 in the first exemplary embodiment. Onboard system 1 includes server apparatus 100, and six onboard monitors 200A, 200B, 200C, 200D, 200E, 200F. Onboard monitors 200A-200F are provided in, for example, passenger seats of an airplane. Server apparatus 100 is connected to onboard monitors 200A-200F by network cables, and performs bidirectional communication such as distribution of contents and acquisition of luminance information of the onboard monitors. The information, such as luminance adjustment of onboard monitors 200A-200F, is collectively managed by server apparatus 100. Onboard monitors 200A-200F can reproduce contents distributed from server apparatus 100 and the like. Onboard monitor 200A includes operation switch 204A; onboard monitor 200B includes operation switch 204B; onboard monitor 200C includes operation switch 204C; onboard monitor 200D includes operation switch 204D; onboard monitor 200E includes operation switch 204E; onboard monitor 200F includes operation switch 204F. Each of onboard monitors 200A-200F has the same configuration, and onboard monitors 200A-200F may be collectively called as onboard monitor 200. In the present exemplary embodiment, as an example, a configuration is described in which six onboard monitors 200 are connected to server apparatus 100, however, a number of onboard monitors 200 is not limited to this and may be any number.

Figure 2:
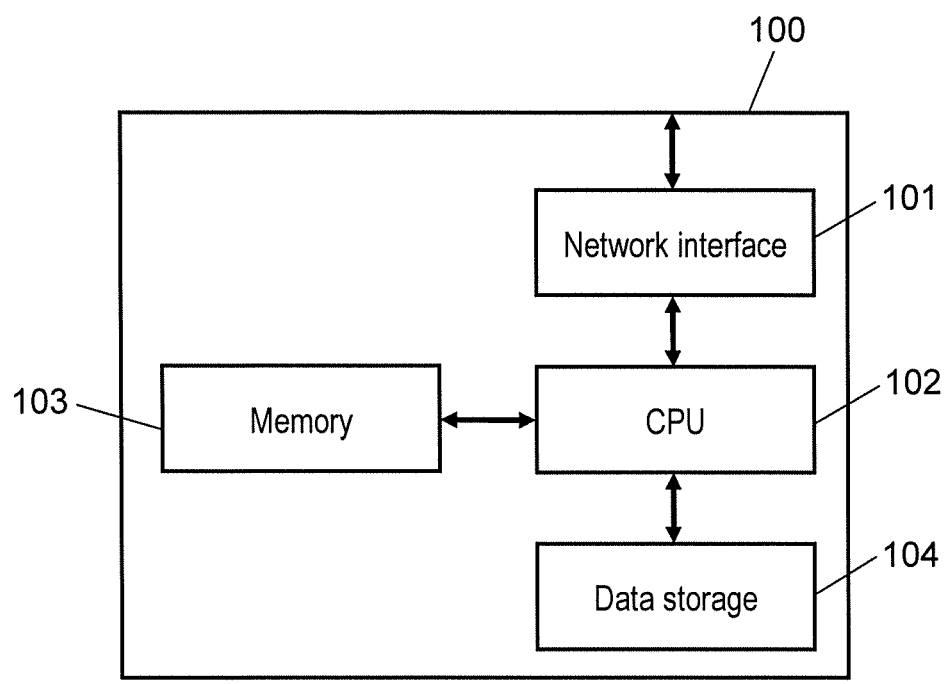
FIG. 2 is a block diagram of a server apparatus in the first exemplary embodiment.

FIG. 2 is a block diagram of server apparatus 100. Server apparatus 100 includes network interface 101, Central Processing Unit (CPU) 102, memory 103, and data storage 104.

Network interface 101 is an interface for CPU 102 to communicate with onboard monitor 200.

CPU 102 executes a program stored in memory 103 to perform various operations and information processing. CPU 102 can read from memory 103 and data storage 104 and write to memory 103 and data storage 104. In addition, CPU 102 communicates with onboard monitor 200 via network interface 101.

CPU 102 further collects luminance information of onboard monitor 200, and instructs onboard monitor 200 to adjust luminance according to operation to be described later.

Memory 103 stores a program to be executed by CPU 102, an operation result of CPU 102, luminance adjustment information of onboard monitor 200, and the like. Memory 103 is configured of a flash memory or Random Access Memory (RAM).

Data storage 104 stores contents to be distributed to onboard monitor 200, and the like. Data storage 104 is configured of a hard disk and the like.

Figure 3:
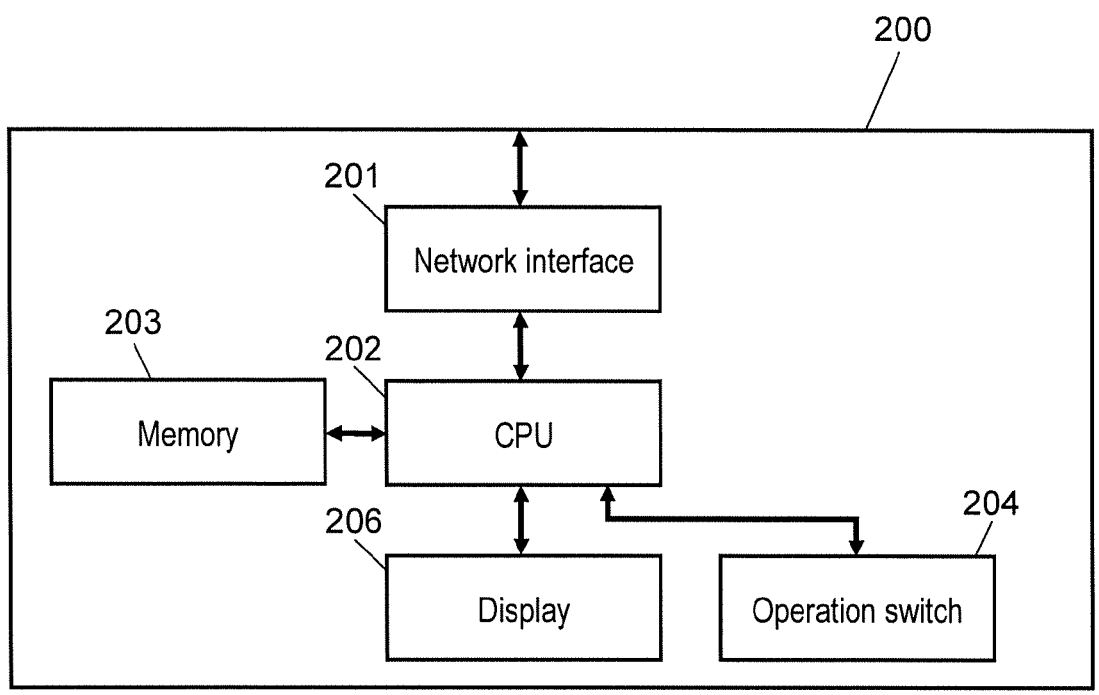
FIG. 3 is a block diagram of an onboard monitor in the first exemplary embodiment.

FIG. 3 is a block diagram of onboard monitor 200. Onboard monitor 200 includes network interface 201, CPU 202, memory 203, operation switch 204, and display 206.

A user who is an airplane passenger can adjust luminance of display 206 by operating operation switch 204. Luminance information of display 206 is stored in memory 203.

CPU 202, when receiving an instruction of collecting luminance information from CPU 102 of server apparatus 100, transmits the luminance information of display 206 stored in memory 203 to server apparatus 100 via network interface 201. In addition, CPU 202, when receiving a luminance adjustment instruction from CPU 102 of server apparatus 100, adjusts luminance of display 206 and stores the luminance information in memory 203.

In addition, CPU 202 displays contents received from server apparatus 100 on display 206.

Onboard system 1 is an example of a control system. Server apparatus 100 is an example of a control apparatus. Onboard monitor 200 is an example of controlled object. CPU 102 is an example of a first controller. Network interface 101 is an example of a first communication unit. CPU 202 is an example of a second controller. Network interface 201 is an example of a second communication unit. Operation switch 204 is an example of an operation unit.

[1-2 Operation]

Figure 4:
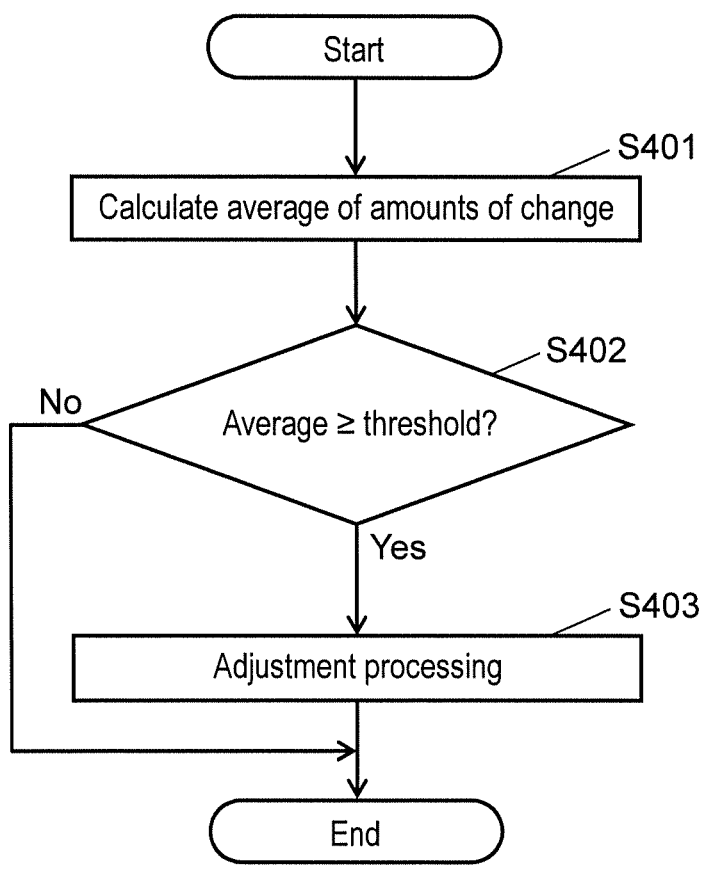
FIG. 4 is a flowchart describing operation for adjusting luminance of the onboard monitor in the first exemplary embodiment.

For onboard system 1 configured as described above, its operation is described below. FIG. 4 is a flowchart for describing operation for adjusting luminance of onboard monitor 200 by server apparatus 100. FIG. 5 is a diagram describing an example of the operation for adjusting luminance of onboard monitor 200.

(S401) CPU 102 acquires the luminance information from each of onboard monitors 200A-200F and calculates an average of amounts of change of luminance from previous acquisition.

CPU 102 transmits the instruction of collecting luminance information to each of onboard monitors 200A-200F per predetermined period. Each CPU 202 of onboard monitors 200A-200F, when receiving the instruction of collecting luminance information, transmits current luminance information of display 206 stored in memory 203 to CPU 102 via network interface 201.

Here, in FIG. 5, a degree of luminance is indicated by a luminance level. There are six levels of the luminance level from 0 to 5, and brightness is greater according to increasing the luminance level from 0 to 5. In FIG. 5, a previous luminance level is 4 and a present luminance level is 4 of onboard monitor 200A; the previous luminance level is 5 and the present luminance level is 2 of onboard monitor 200B; the previous luminance level is 4 and the present luminance level is 1 of onboard monitor 200C; the previous luminance level is 3 and the present luminance level is 2 of onboard monitor 200D; the previous luminance level is 3 and the present luminance level is 3 of onboard monitor 200E; the previous luminance level is 4 and present luminance level is 2 of onboard monitor 200F.

Then, CPU 102 calculates a difference between luminance of previously acquisition and luminance of current acquisition for each of onboard monitors 200A-200F.

Incidentally, although luminance to be acquired in the first time is acquired when onboard system 1 is started, since there is no previous luminance level, the operation for adjusting luminance is not performed.

In FIG. 5, the difference of onboard monitor 200A is 0; the difference of onboard monitor 200B is 3; the difference of onboard monitor 200C is 3; the difference of onboard monitor 200D is 1; the difference of onboard monitor 200E is 0; the difference of onboard monitor 200F is 2.

CPU 102 classifies each of onboard monitors 200A-200F into a first onboard monitor group in which the difference is detected between luminance of current acquisition and luminance of previously acquisition, and a second onboard monitor group in which the difference is not detected. That is, the first onboard monitor group is a group of onboard monitors 200 in which the user has adjusted luminance of display 206 after previously acquisition and before current acquisition. In addition, the second onboard monitor group is a group of onboard monitors 200 in which the user has not adjusted luminance of display 206 after previously acquisition.

In FIG. 5, the first onboard monitor group includes onboard monitors 200B, 200C, 200D, and onboard monitor 200F, and the second onboard monitor group includes onboard monitor 200A and onboard monitor 200E.

CPU 102 calculates an average of amounts of change which are differences of luminance of onboard monitor 200 included in the first onboard monitor group.

In FIG. 5, the average is 2.25 of the difference 3 of onboard monitor 200B, the difference 3 of onboard monitor 200C, the difference 1 of onboard monitor 200D, and the difference 2 of onboard monitor 200F included in the first onboard monitor group.

Incidentally, in step S401, the average of the amounts of change which are the differences of luminance of onboard monitor 200 included in the first onboard monitor group may be calculated by CPU 102 when the number of onboard monitors 200 included in the first onboard monitor group is greater than the number of onboard monitors 200 included in the second onboard monitor group. This is because it is considered that there is a change in cabin environment when the number of onboard monitors 200 in which luminance has been adjusted is greater than the number of onboard monitors 200 in which luminance has not been adjusted.

Incidentally, in step S401, as onboard monitor 200 from which the luminance information is collected, only onboard monitor 200 being used by the passenger may be targeted. This is because it is considered that the luminance adjustment of onboard monitor 200 of a vacant seat is unnecessary. For example, for a decision whether or not onboard monitor 200 is being used by the passenger, a reservation status of a seat is registered in advance with data storage 104 of server apparatus 100, and the reservation status of the seat is checked by CPU 102 of server apparatus 100. Then, CPU 102 makes onboard monitor 200 of the seat reserved be onboard monitor 200 from which the luminance information is collected.

(S402) CPU 102 compares the average of the amounts of change calculated in step S401 and a threshold stored in advance in memory 103. CPU 102 advances processing to S403 when determining that the calculated average is equal to or greater than the threshold (Yes). CPU 102 ends the processing when determining that the calculated average is less than the threshold (No).

In FIG. 5, since the threshold is 2 and the calculated average 2.25 is greater than the threshold 2, the processing proceeds to S403.

(S403) The luminance adjustment instruction is transmitted to onboard monitor 200 included in the second onboard monitor group via network interface 101. CPU 202 received the luminance adjustment instruction adjusts luminance of display 206 depending on instruction content. In addition, adjusted luminance information is stored in memory 203.

In FIG. 5, the luminance adjustment instruction is transmitted to onboard monitor 200A and onboard monitor 200E included in the second onboard monitor group so that the luminance level is adjusted from current luminance level to the luminance level 1 of onboard monitor 200C in which the current luminance level is minimum of onboard monitor 200 of the first onboard monitor group. Each CPU 202 of onboard monitor 200A and onboard monitor 200E received the luminance adjustment instruction adjusts the luminance level of display 206 to change to 1. In addition, adjusted luminance level 1 is stored in each memory 203.

Incidentally, as the luminance adjustment instruction, other than the instruction to adjust to the minimum value of luminance in onboard monitor 200 included in the first onboard monitor group, an instruction is considered for adjusting to an average of current luminance of onboard monitor 200 in the first onboard monitor group, however, it is not limited to these.

In the operation for adjusting luminance of onboard monitor 200 by server apparatus 100, luminance may be adjusted collectively for all onboard monitors 200 disposed in the airplane, and luminance of the onboard monitor may also be adjusted for each group by grouping the onboard monitors into each class such as the business class and the economy class, or grouping the onboard monitors into the left side, the center, the right side, and the like separated by isles, or grouping the onboard monitors by adjacent seats of front, back, left and right.

In addition, collecting the luminance information may be adjusted based on a change of flight information to be received from an aircraft side interface, instead of being adjusted per predetermined period.

[1-3 Effects]

As described above, server apparatus 100 of the present exemplary embodiment includes network interface 101 for receiving adjustment information relating to luminance adjustment from a plurality of onboard monitors 200 capable of luminance adjustment and transmitting an adjustment instruction relating to luminance adjustment to the plurality of onboard monitors 200, and CPU 102 for specifying a first onboard monitor group, which includes at least one of the plurality of onboard monitors 200 adjusted luminance in a predetermined period among the plurality of onboard monitors 200 based on the adjustment information received by network interface 101, and a second onboard monitor group, which includes at least one of the plurality of onboard monitors 200 not included in the first onboard monitor group, and determining the adjustment instruction based on the adjustment information in the plurality of onboard monitors 200 included in the first onboard monitor group, and instructing the plurality of onboard monitors 200 included in the second onboard monitor group to adjust luminance via network interface 101 by the adjustment instruction.

Thus, when any user adjusts luminance of onboard monitor 200 depending on brightness in the airplane, server apparatus 100 can adjust luminance of onboard monitor 200 not adjusted by another user, using the luminance information of onboard monitor 200 in which luminance has been adjusted. For example, when lighting in a cabin becomes dark during a night flight, and a passenger is away from a seat without adjusting luminance of onboard monitor 200 or the passenger falls asleep while watching a movie and the like, luminance of onboard monitor 200 which seems to be relatively bright can be automatically adjusted. That is, server apparatus 100 can adjust luminance of onboard monitor 200 that is the controlled object, depending on the situation. Thus, discomfort from bright light for onboard monitor 200 around the user can be reduced.

Second Exemplary Embodiment

A second exemplary embodiment is described below with reference to FIG. 6 to FIG. 7.

[2-1 Configuration]

Figure 6:
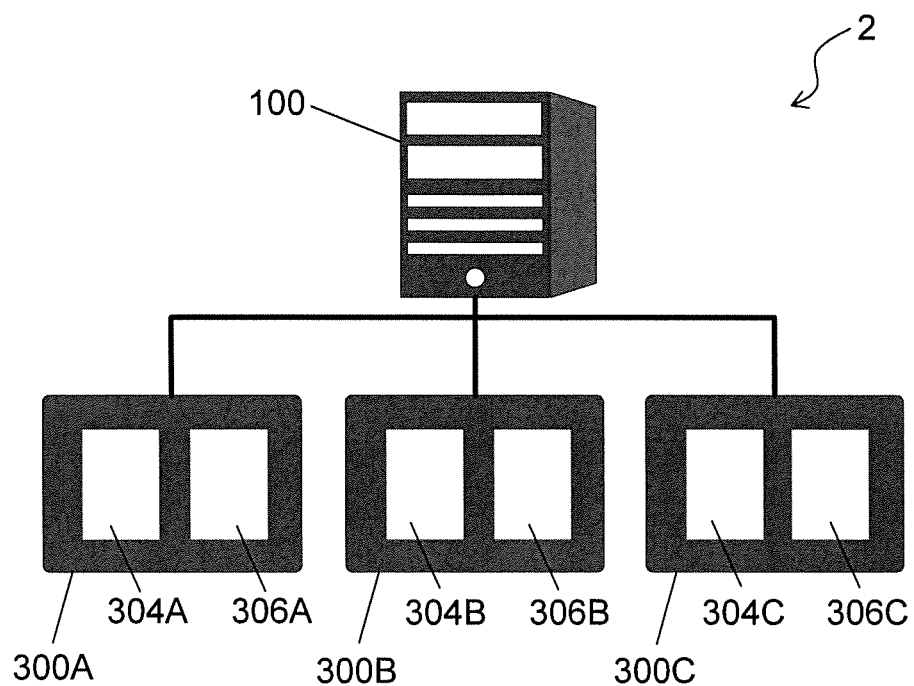
FIG. 6 is a block diagram of an onboard system in a second exemplary embodiment.

FIG. 6 is a block diagram of onboard system 2 in the second exemplary embodiment. Onboard system 2 includes server apparatus 100, and three control units 300A, 300B, 300C. Control unit 300A includes operation switch 304A and light 306A; control unit 300B includes operation switch 304B and light 306B; control unit 300C includes operation switch 304C and light 306C. Here, lights 306A-306C are, for example, reading lights used for illuminating a spot close at hand of the user.

Server apparatus 100 is connected to control units 300A-300C by network cables, and performs bidirectional communication such as acquisition of illuminance information of the lights. The information, such as illuminance adjustment of control units 300A-300C, is collectively managed by server apparatus 100. Each of control units 300A-300C has the same configuration, and control units 300A-300C may be collectively called as control unit 300. In addition, operation switches 304A-304C may be collectively called as operation switch 304, and lights 306A-306C may be collectively called as light 306.

In the present exemplary embodiment, as an example, a configuration is described in which three control units 300 are connected to server apparatus 100; however, a number of control units 300 is not limited to this and may be any number.

Figure 7:
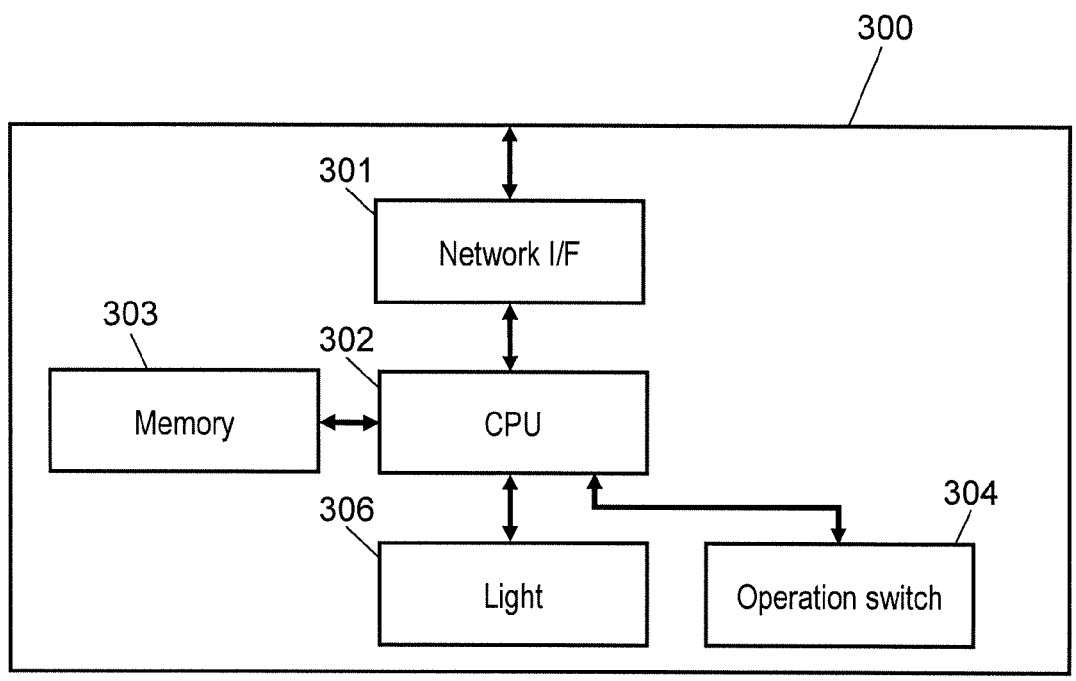
FIG. 7 is a block diagram of a control unit in the second exemplary embodiment.

FIG. 7 is a block diagram of control unit 300 in the second exemplary embodiment. Control unit 300 includes network interface 301, CPU 302, memory 303, operation switch 304, and light 306. A user who is an airplane passenger can adjust illuminance of light 306 by operating operation switch 304. Illuminance information of light 306 is stored in memory 303.

CPU 302, when receiving an instruction of collecting illuminance information from CPU 102 of server apparatus 100, transmits the illuminance information of light 306 stored in memory 303 to server apparatus 100 via network interface 301. In addition, CPU 302, when receiving an illuminance adjustment instruction from CPU 102 of server apparatus 100, adjusts illuminance of light 306 and stores the illuminance information in memory 303.

Incidentally, in FIG. 7, although a number of lights 306 of control unit 300 is one, there may be a plurality of lights 306.

Onboard system 2 is an example of a control system. Server apparatus 100 is an example of a control apparatus. Light 306 of control unit 300 is an example of controlled object. CPU 102 is an example of a first controller. Network interface 101 is an example of a first communication unit. CPU 302 is an example of a second controller. Network interface 301 is an example of a second communication unit. Operation switch 304 is an example of an operation unit.

[2-2 Operation]

For onboard system 2 configured as described above, its operation is described below. In onboard system 1 of the first exemplary embodiment, server apparatus 100 adjusts the luminance of onboard monitor 200; however, onboard system 2 of the present exemplary embodiment is different in that server apparatus 100 adjusts illuminance of control unit 300. Since operation for adjusting illuminance of light 306 of control unit 300 by server apparatus 100, in comparison with operation for adjusting luminance of onboard monitor 200 by server apparatus 100, is different only in the controlled objects in which brightness is adjusted and is generally the same operation, the operation is described with reference to the flowchart in FIG. 4.

(S401) CPU 102 acquires the illuminance information from each of control units 300A-300C and calculates an average of amounts of change of illuminance from previous acquisition.

CPU 102 transmits the instruction of collecting illuminance information to each of control units 300A-300C per predetermined period. Here, the illuminance information is brightness information of light 306 operated with operation switch 304. Each CPU 302 of control units 300A-300C, when receiving the instruction of collecting illuminance information, transmits current illuminance information of light 306 stored in memory 303 to CPU 102 via network interface 301.

Then, CPU 102 calculates a difference between illuminance of previously acquisition and illuminance of current acquisition for each control units 300A-300C.

Incidentally, although illuminance to be acquired in the first time is acquired when onboard system 2 is started, since there is no previous illuminance, the operation for adjusting illuminance is not performed.

CPU 102 classifies each of control units 300A-300C into a first control unit group in which the difference is detected between the illuminance of current acquisition and illuminance of previously acquisition, and a second control unit group in which the difference is not detected. That is, the first control unit group is a group of control units 300 in which the user has adjusted illuminance of light 306 after previously acquisition and before current acquisition. In addition, the second control unit group is a group of control units 300 in which the user has not adjusted illuminance of light 306 after previously acquisition.

CPU 102 calculates an average of amounts of change which are differences of illuminance of control unit 300 included in the first control unit group.

Incidentally, in step S401, the average of amounts of change which are the differences of illuminance of control unit 300 included in the first control unit group may be calculated by CPU 102 when the number of control units 300 included in the first control unit group is greater than the number of control units 300 included in the second control unit group. This is because it is considered that there is a change in cabin environment when the number of control units 300 in which illuminance has been adjusted is greater than the number of control units 300 in which illuminance has not been adjusted.

Incidentally, in step S401, as control unit 300 from which the illuminance information is collected, only control unit 300 being used by the passenger may be targeted. This is because it is considered that the illuminance adjustment of control unit 300 of a vacant seat is unnecessary. For example, for a decision whether or not control unit 300 is being used by the passenger, a reservation status of a seat is registered in advance with data storage 104 of server apparatus 100, and the reservation status is checked by CPU 102 of server apparatus 100. Then, CPU 102 makes control unit 300 of the seat reserved be control unit 300 from which the illuminance information is collected.

(S402) CPU 102 compares the average of the amounts of change calculated in step S401 and a threshold stored in advance in memory 103. CPU 102 advances processing to S403 when determining that the calculated average is equal to or greater than the threshold (Yes). CPU 102 ends the processing when determining that the calculated average is less than the threshold (No).

(S403) The illuminance adjustment instruction is transmitted to control unit 300 included in the second control unit group via network interface 101. CPU 302 received the illuminance adjustment instruction adjusts illuminance of light 306 depending on instruction content. In addition, adjusted illuminance information is stored in memory 303.

Incidentally, as the illuminance adjustment instruction, instructions are considered such as an instruction for adjusting to an average of current illuminance of control unit 300 in the first control unit group, and an instruction for adjusting to illuminance of control unit 300 in which illuminance is minimum of control unit 300 included in the first control unit group; however, it is not limited to these.

In the operation for adjusting the illuminance of light 306 by server apparatus 100, illuminance may be adjusted collectively for all control units 300 disposed in the airplane, and illuminance of the lights of the control units may also be adjusted for each group by grouping the control units into each class such as the business class and the economy class, or grouping the control units into the left side, the center, the right side, and the like separated by isles, or grouping the control units by adjacent seats of front, back, left and right.

In addition, collecting the illuminance information may be adjusted based on a change of flight information to be received from an aircraft side interface, instead of being adjusted per predetermined period.

[2-3 Effects]

As described above, server apparatus 100 of the present exemplary embodiment includes network interface 101 for receiving adjustment information relating to the illuminance adjustment of light 306 from a plurality of control units 300 capable of illuminance adjustment of light 306 and transmitting an adjustment instruction relating to illuminance adjustment of light 306 to the plurality of control units 300, and CPU 102 for specifying a first control unit group, which includes at least one of the plurality of control units 300 adjusted illuminance in a predetermined period among the plurality of control units 300 based on the adjustment information received by network interface 101, and a second control unit group, which includes at least one of the plurality of control units 300 not included in the first control unit group, and determining the adjustment instruction based on the adjustment information in the plurality of control units 300 included in the first control unit group, and instructing control unit 300 included in the second control unit group to adjust illuminance via network interface 101 by the adjustment instruction.

Thus, when any user adjusts illuminance of light 306 depending on brightness in the airplane, server apparatus 100 can adjust illuminance of light 306 not adjusted by another user, using the illuminance information of light 306 in which illuminance has been adjusted. For example, when lighting in a cabin becomes dark during a night flight, and a passenger is away from a seat, or the passenger falls asleep, illuminance of light 306 which seems to be relatively bright can be automatically adjusted. That is, server apparatus 100 can adjust illuminance of light 306 of control unit 300 that is the controlled object depending on the situation. Thus, discomfort from bright light for control unit 300 around the user can be reduced.

Third Exemplary Embodiment

A third exemplary embodiment is described below with reference to FIG. 8-9.

[3-1 Configuration]

Figure 8:
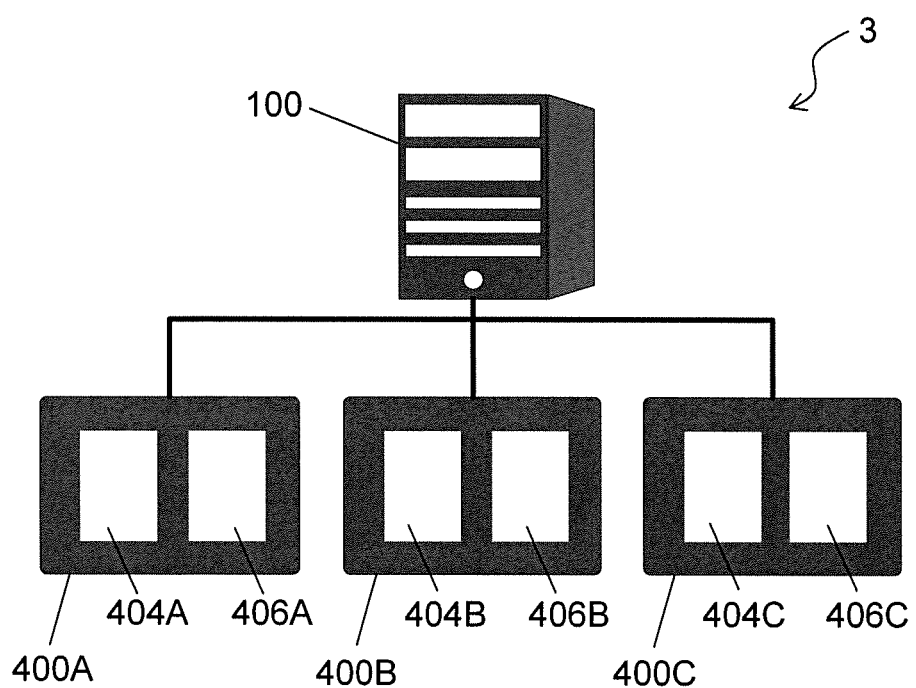
FIG. 8 is a block diagram of an onboard system in a third exemplary embodiment.

FIG. 8 is a block diagram of onboard system 3 in the third exemplary embodiment. Onboard system 3 includes server apparatus 100, and three control units 400A, 400B, 400C. Control unit 400A includes operation switch 404A and electronic window 406A; control unit 400B includes operation switch 404B and electronic window 406B; control unit 400C includes operation switch 404C and electronic window 406C.

Server apparatus 100 is connected to control units 400A-400C by network cables, and performs bidirectional communication such as acquisition of transmittance information of the electronic windows. The information, such as transmittance adjustment of control units 400A-400C, is collectively managed by server apparatus 100. Each of control units 400A-400C has the same configuration, and control units 400A-400C may be collectively called as control unit 400. In addition, operation switches 404A-404C may be collectively called as operation switch 404.

In the present exemplary embodiment, as an example, a configuration is described in which three control units 400 are connected to server apparatus 100; however, a number of control units 400 is not limited to this and may be any number.

Figure 9:
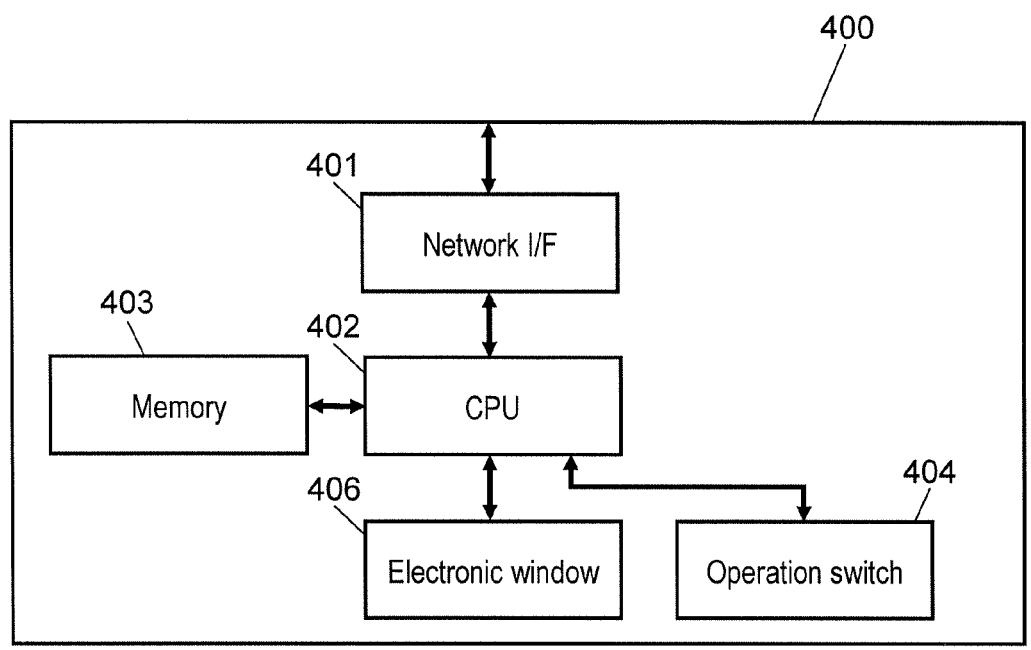
FIG. 9 is a block diagram of a control unit in the third exemplary embodiment.

FIG. 9 is a block diagram of control unit 400 in the third exemplary embodiment. Control unit 400 includes network interface 401, CPU 402, memory 403, operation switch 404, and electronic window 406.

Electronic window 406 is also called as electronic curtain, and is used as a substitute for a window shade of a passenger seat of an airplane. Electronic window 406 is configured by providing an intermediate layer in which transmittance is electrically changed between two glass plates. A user who is an airplane passenger can adjust transmittance of electronic window 406 by operating operation switch 404. Transmittance information of electronic window 406 is stored in memory 403.

CPU 402, when receiving an instruction of collecting transmittance information from CPU 102 of server apparatus 100, transmits the transmittance information of electronic window 406 stored in memory 403 to server apparatus 100 via network interface 401. In addition, CPU 402, when receiving a transmittance adjustment instruction from CPU 102 of server apparatus 100, adjusts transmittance of electronic window 406, and stores the transmittance information in memory 403.

Incidentally, in FIG. 9, although a number of electronic windows 406 of control unit 400 is one, there may be a plurality of electronic windows 406.

Onboard system 3 is an example of a control system. Server apparatus 100 is an example of a control apparatus. Electronic window 406 of control unit 400 is an example of controlled object. CPU 102 is an example of a first controller. Network interface 101 is an example of a first communication unit. CPU 402 is an example of a second controller. Network interface 401 is an example of a second communication unit. Operation switch 404 is an example of an operation unit.

[3-2 Operation]

For onboard system 3 configured as described above, its operation is described below. In onboard system 1 of the first exemplary embodiment, server apparatus 100 adjusts luminance of onboard monitor 200; however, onboard system 3 of the present exemplary embodiment is different in that server apparatus 100 adjusts transmittance of control unit 400. Since operation for adjusting transmittance of electronic window 406 of control unit 400 by server apparatus 100, in comparison with operation for adjusting the luminance of onboard monitor 200 by server apparatus 100, is different only in the controlled objects in which brightness is adjusted and is generally the same operation, the operation is described with reference to the flowchart in FIG. 4.

(S401) CPU 102 acquires the transmittance information from each of control units 400A-400C and calculates an average of amounts of change of transmittance from previous acquisition.

CPU 102 transmits the instruction of collecting transmittance information to each of control units 400A-400C per predetermined period. Here, the transmittance information is information of transmittance of electronic window 406 operated with operation switch 404. Each CPU 402 of control units 400A-400C, when receiving the instruction of collecting transmittance information, transmits current transmittance information of electronic window 406 stored in memory 403 to CPU 102 via network interface 401.

Then, CPU 102 calculates a difference between transmittance of previously acquisition and transmittance of current transmittance for each control units 400A-400C.

Incidentally, although transmittance to be acquired in the first time is acquired when onboard system 3 is started, since there is no previous transmittance, the operation for adjusting transmittance is not performed.

CPU 102 classifies each of control units 400A-400C into a first control unit group in which the difference is detected between transmittance of current acquisition and transmittance of previously acquisition, and a second control unit group in which the difference is not detected. That is, the first control unit group is a group of control units 400 in which the user has adjusted transmittance of electronic window 406 after previously acquisition and before current acquisition. In addition, the second control unit group is a group of control units 400 in which the user has not adjusted transmittance of electronic window 406 after previously acquisition.

CPU 102 calculates an average of amounts of change which are differences of transmittance of control unit 400 included in the first control unit group.

Incidentally, in step S401, the average of amounts of change which are the differences of transmittance of control unit 400 included in the first control unit group may be calculated by CPU 102 when the number of control units 400 included in the first control unit group is greater than the number of control units 400 included in the second control unit group. This is because it is considered that there is a change in cabin environment when the number of control units 400 in which transmittance has been adjusted is greater than the number of control units 400 in which transmittance has not been adjusted.

Incidentally, in step S401, as control unit 400 from which the transmittance information is collected, only control unit 400 being used by the passenger may be targeted. This is because it is considered that the transmittance adjustment of control unit 400 of a vacant seat is unnecessary. For example, for a decision whether or not control unit 400 is being used by the passenger, a reservation status of a seat is registered in advance with data storage 104 of server apparatus 100, and the reservation status of a seat is checked by CPU 102 of server apparatus 100. Then, CPU 102 makes control unit 400 of the seat reserved be control unit 400 from which the transmittance information is collected.

(S402) CPU 102 compares the average of the amounts of change calculated in step S401 and a threshold stored in advance in memory 103. CPU 102 advances processing to S403 when determining that the calculated average is equal to or greater than the threshold (Yes). CPU 102 ends the processing when determining that the calculated average is less than the threshold (No).

(S403) The transmittance adjustment instruction is transmitted to control unit 400 included in the second control unit group via network interface 101. CPU 402 received the transmittance adjustment instruction adjusts transmittance of electronic window 406 depending on instruction content. In addition, adjusted transmittance information is stored in memory 403.

Incidentally, as the transmittance adjustment instruction, instructions are considered such as an instruction for adjusting to an average of current transmittance of control unit 400 in the first control unit group, and an instruction for adjusting to transmittance of control unit 400 in which the transmittance is minimum of control unit 400 included in the first control unit group; however, it is not limited to these.

In the operation for adjusting transmittance of electronic window 406 by server apparatus 100, transmittance may be adjusted collectively for all control units 400 disposed in the airplane, and transmittance may also be adjusted for each group by grouping the control units into each class such as the business class and the economy class, and grouping the control units by left side, right side, and the like of the airplane.

In addition, collecting the transmittance information may be adjusted based on a change of flight information to be received from an aircraft side interface, instead of being adjusted per predetermined period.

[3-3 Effects]

As described above, server apparatus 100 of the present exemplary embodiment includes network interface 101 for receiving adjustment information relating to transmittance adjustment of electronic window 406 from a plurality of control units 400 capable of transmittance adjustment of electronic window 406 and transmitting an adjustment instruction relating to transmittance adjustment of electronic window 406 to the plurality of control units 400, and CPU 102 for specifying a first control unit group, which includes at least one of the plurality of control units 400 adjusted transmittance in a predetermined period among the plurality of control units 400 based on the adjustment information received by network interface 101, and a second control unit group, which includes at least one of the plurality of control units 400 not included in the first control unit group, and determining the adjustment instruction based on the adjustment information in the plurality of control units 400 included in the first control unit group, and instructing control unit 400 included in the second control unit group to adjust transmittance via network interface 101 by the adjustment instruction.

Thus, when any user adjusts transmittance of electronic window 406 depending on brightness outside the windows of the airplane, server apparatus 100 can adjusts transmittance of electronic window 406 not adjusted by another passenger, using the transmittance information of electronic window 406 in which transmittance has been adjusted. For example, when light of the afternoon sun enters into the airplane during a flight and a passenger feels bright, and the passenger of a seat close to the window is away from the seat or a seat close to the window is vacant, transmittance of electronic window 406 which seems to be relatively bright can be automatically adjusted. That is, server apparatus 100 can adjust transmittance of electronic window 406 of control unit 400 that is the controlled object depending on the situation. Thus, discomfort from bright outside the window of the airplane can be reduced.

Other Exemplary Embodiment

As described above, the first to third exemplary embodiments have been described as examples of the technique of the present disclosure. However, the technique in the present disclosure is not limited to these, and it is also possible to apply to an exemplary embodiment in which modification, replacement, addition, omission are appropriately performed. In addition, it is possible to make a new exemplary embodiment by combining elements described in the first to third exemplary embodiment.

Therefore, the other exemplary embodiment is exemplified below.

In the first to third exemplary embodiments, each of the examples has been described in which connection is made with the network cables between the server apparatus and the onboard monitor or the control unit, which are the controlled objects. However, the connection is not limited to the network cables. For example, wireless communication may be used.

In the first exemplary embodiment, onboard monitor 200 has the configuration including operation switch 204 for adjusting luminance of display 206. Adjustment of luminance of display 206 is not limited to operation switch 204. For example, onboard monitor 200 includes a touch panel, and luminance of display 206 may be adjusted by operation of the touch panel by the user. For the operation switches in the second exemplary embodiment, third exemplary embodiment, luminance can be adjusted in the same manner.

As described above, the exemplary embodiments have been described as exemplifications of technique of the present disclosure. For this purpose, the accompanying drawings and the detailed description have been provided.

Accordingly, in the elements described in the accompanying drawings and the detailed description, there may be included not only essential elements for solving problem but also non-essential elements for solving problem, to illustrate the above technique. Therefore, it should not be certified that those non-essential elements are essential immediately, from the fact that those non-essential elements are described in the accompanying drawings and the detailed description.

Further, since the above described exemplary embodiments are intended to illustrate the technique of the present disclosure, various modifications, substitutions, additions, omissions and the like can be performed within the scope of the claims or the scope of the equivalents of the claims.

What is claimed is:

1. A control apparatus comprising:
   a communication unit configured to receive adjustment information relating to brightness adjustment from a plurality of controlled objects capable of brightness adjustment, and to transmit an adjustment instruction relating to brightness adjustment to the plurality of controlled objects; and
   a controller configured to specify a first group, which includes at least one of the plurality of controlled objects adjusted brightness in a predetermined period among the plurality of controlled objects based on the adjustment information received by the communication unit, and, a second group, which includes at least one of the plurality of controlled objects not included in the first group, and to determine the adjustment instruction based on the adjustment information in the plurality of controlled objects included in the first group, and to instruct the plurality of controlled objects included in the second group to adjust brightness via the communication unit by the adjustment instruction.

2. The control apparatus according to claim 1, wherein the controller determines the adjustment instruction and instructs the plurality of controlled objects included in the second group to adjust brightness when a number of the plurality of controlled objects included in the first group is greater than a number of the plurality of controlled objects included in the second group.

3. The control apparatus according to claim 1, wherein:
the plurality of controlled objects are monitors, and
brightness adjustment is luminance adjustment of the monitors.

4. The control apparatus according to claim 1, wherein:
the plurality of controlled objects are lights, and
brightness adjustment is illuminance adjustment of the lights.

5. The control apparatus according to claim 1, wherein:
the plurality of controlled objects are electronic windows, and
brightness adjustment is transmittance adjustment of the electronic windows.

6. The control apparatus according to claim 1, wherein brightness adjustment is decreasing brightness of the plurality of controlled objects.

7. A control method comprising:
receiving adjustment information relating to brightness adjustment from a plurality of controlled objects capable of brightness adjustment;
specifying a first group, which includes at least one of the plurality of controlled objects adjusted brightness in a predetermined period among the plurality of controlled objects based on the adjustment information, and, a second group, which includes at least one of the plurality of controlled objects not included in the first group;
determining an adjustment instruction based on the adjustment information in the plurality of controlled objects included in the first group; and
transmitting the adjustment instruction to the plurality of controlled objects included in the second group.

8. The control method according to claim 7,
determining the adjustment instruction and transmitting the adjustment instruction when a number of the plurality of controlled objects included in the first group is greater than a number of the plurality of controlled objects included in the second group.

9. The control method according to claim 7, wherein:
the plurality of controlled objects are monitors, and
brightness adjustment is luminance adjustment of the monitors.

10. The control method according to claim 7, wherein:
the plurality of controlled objects are lights, and
brightness adjustment is illuminance adjustment of the lights.

11. The control method according to claim 7, wherein:
the plurality of controlled objects are electronic windows, and brightness adjustment is transmittance adjustment of the electronic windows.

12. The control method according to claim 7, wherein brightness adjustment is decreasing brightness of the plurality of controlled objects.

13. A control system comprising:
a plurality of controlled objects and a control apparatus configured to instruct the plurality of controlled objects to adjust brightness,
wherein the control apparatus includes:
a first communication unit configured to receive adjustment information relating to brightness adjustment from the plurality of controlled objects capable of brightness adjustment, and to transmit an adjustment instruction relating to brightness adjustment to the plurality of controlled objects, and
a first controller configured to specify a first group, which includes at least one of the plurality of controlled objects adjusted brightness in a predetermined period among the plurality of controlled objects based on the adjustment information received by the first communication unit, and, a second group, which includes at least one of the plurality of controlled objects not included in the first group, and to determine the adjustment instruction based on the adjustment information in the plurality of controlled objects included in the first group, and to instruct the plurality of controlled objects included in the second group to adjust brightness via the first communication unit by the adjustment instruction, and
wherein each of the plurality of controlled objects includes:
an element capable of brightness adjustment,
an operation unit configured to receive brightness adjustment instruction of the element by a user,
a second communication unit configured to transmit the information relating to brightness adjustment received by the operation unit to the control apparatus and to receive the adjustment instruction from the control apparatus, and
a second controller configured to adjust brightness of the element based on the brightness adjustment instruction received by the operation unit and the adjustment instruction received from the control apparatus by the second communication unit.

14. The control system according to claim 13, wherein the first controller determines the adjustment instruction and instructs the plurality of controlled objects included in the second group to adjust brightness when a number of the plurality of controlled objects included in the first group is greater than a number of the plurality of controlled objects included in the second group.

15. The control system according to claim 13, wherein:
the plurality of controlled objects are monitors, and
brightness adjustment is luminance adjustment of the monitors.

16. The control system according to claim 13, wherein:
the plurality of controlled objects are lights, and
brightness adjustment is illuminance adjustment of the lights.

17. The control system according to claim 13, wherein:
the plurality of controlled objects are electronic windows, and
brightness adjustment is transmittance adjustment of the electronic windows.

18. The control system according to claim 13, wherein brightness adjustment is decreasing brightness of the plurality of controlled objects.

* * * * *